Oct. 21, 1969 W. E. HORTMANN ET AL 3,473,228
PRECISION DRAFTING APPARATUS
Filed May 14, 1968 2 Sheets-Sheet 1
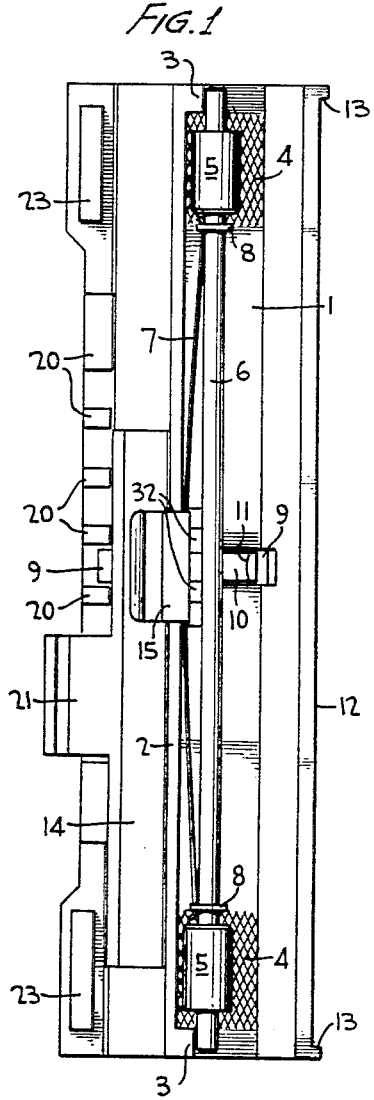
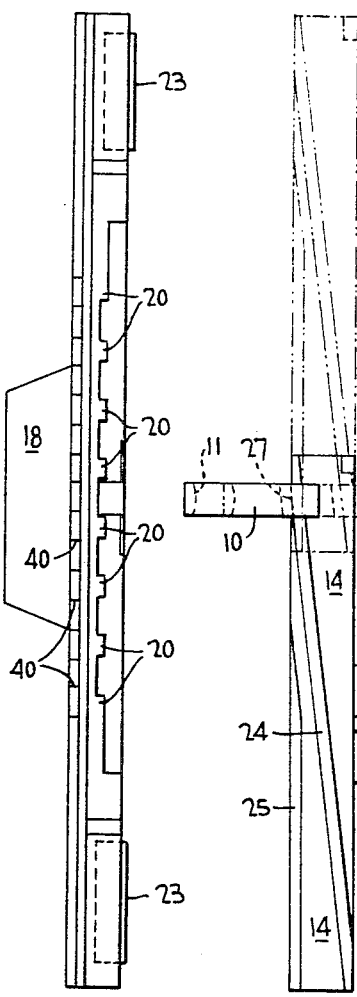
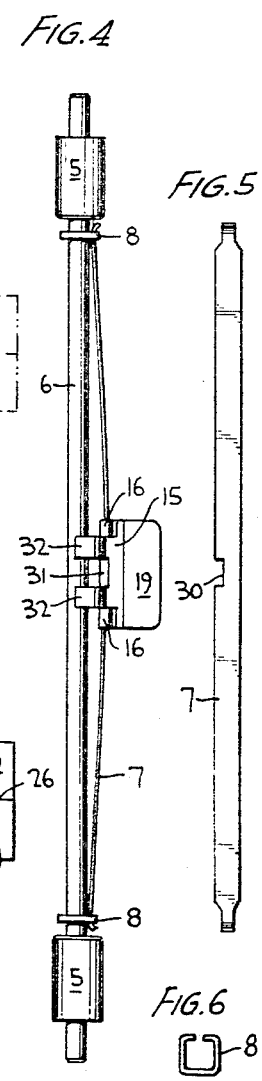
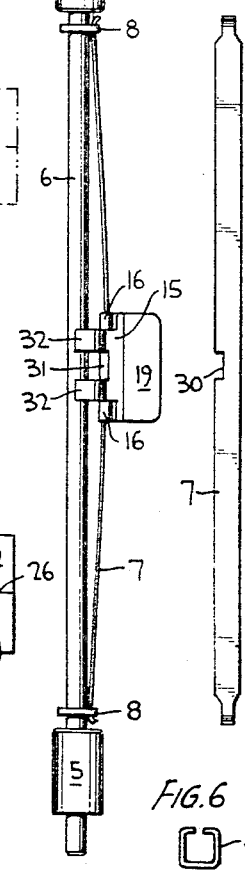
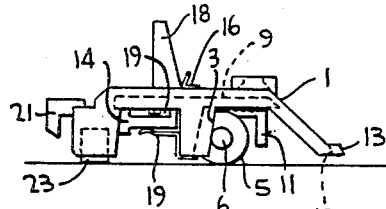
INVENTORS,
WALTER ERICH HORTMANN
WERNER KARL HORTMANN
BY Jacobi & Davidson
ATTORNEYS

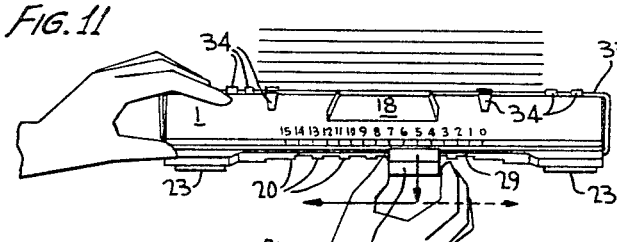
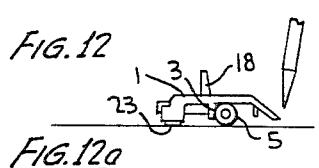
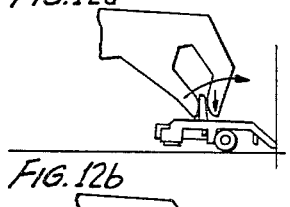
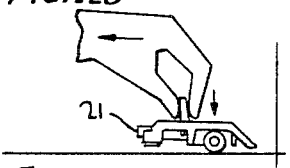
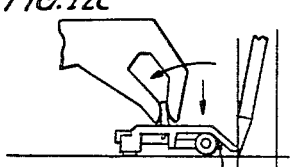
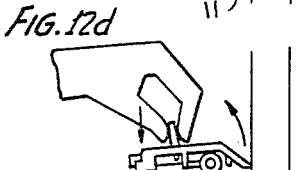
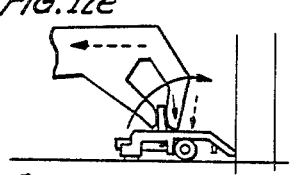
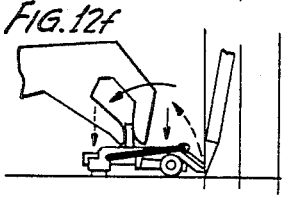
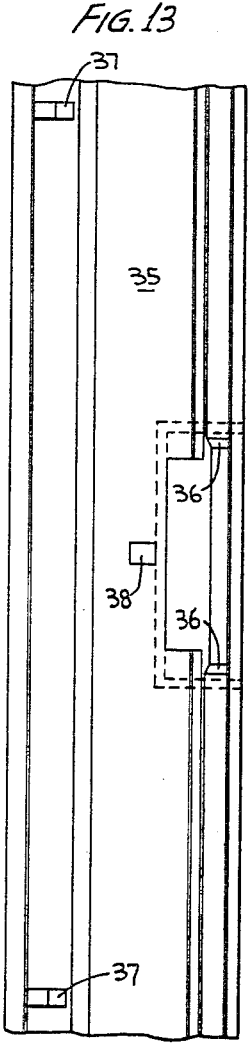
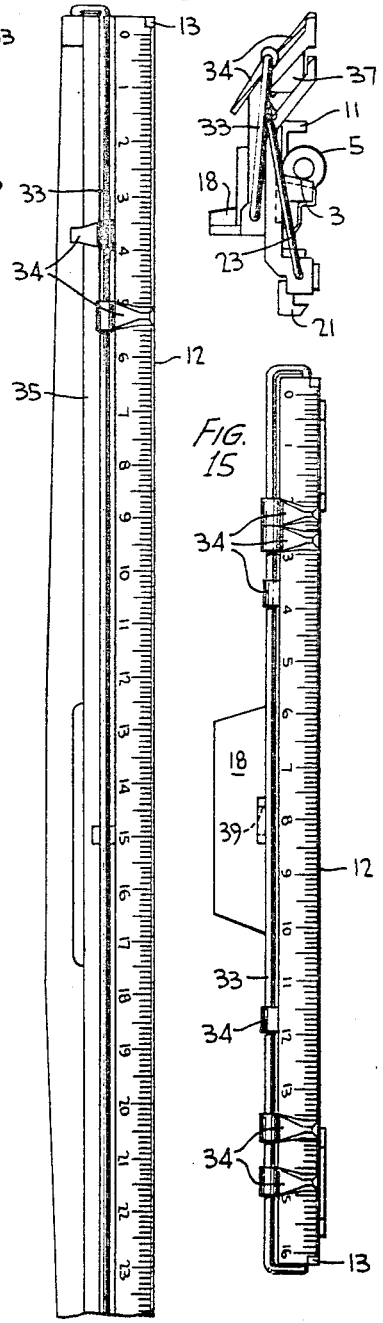
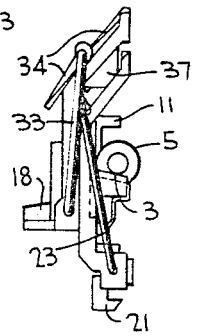
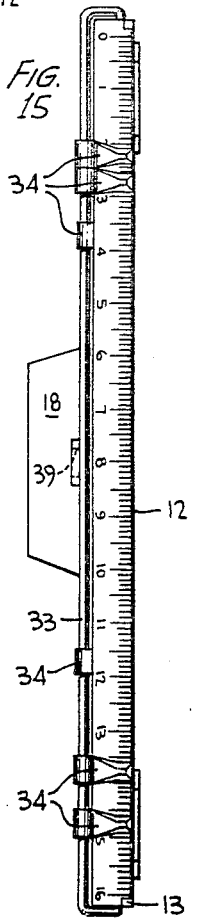

United States Patent Office 3,473,228
Patented Oct. 21, 1969

3,473,228
PRECISION DRAFTING APPARATUS
Walter Erich Hortmann and Werner Karl Hortmann, both of Langemuhle, Schotten, Germany
Filed May 14, 1968, Ser. No. 729,034
Claims priority, application Germany, May 19, 1967, H 62,783
Int. Cl. B43l 13/24
U.S. Cl. 33—110                                         9 Claims

ABSTRACT OF THE DISCLOSURE

The inventive drafting apparatus includes a shaft member provided with roller means, wherein the shaft member and roller means are mounted for displacement at the housing of the drafting apparatus. A fixed stop means and adjustable stop means serves to limit the displacement movement of the roller means. Adjustment slide means including an adjustment grip means serves to selectively fix the position of the adjustable stop means so that it is possible to regulate the spacing between the lines to be drawn, as desired. The adjustment grip means can be set at an enlarged adjustment scale means so that the adjustment slide means and therewith the adjustable stop means can be selectively positioned.

Background of the invention

The present invention relates to an improved drafting apparatus which receives its parallel guiding motion upon the drafting paper by means of rollers, and further, possesses a scale for measuring the displacement paths and/or a stepping device for maintaining the same displacement paths, as such, for instance, are known as rollable rulers or cross-hatching or sectioning rulers.

With all rollable rulers of the most different prior art types of construction the spacing for the parallel lines which are to be drawn is either first pre-measured or read-off of a scale. In many of the prior art constructions, the scale values must be continuously added. With the known drafting devices it is impossible, when stopping the device to prevent inaccuracies at the scale values for the purpose of drawing lines which possess the same spacing from one another.

Therefore, it has already been proposed to provide toothed or serrated wheels with spring catches or notches at the shaft of rollable rulers, in order to construct such devices as cross-hatching rulers. However, the spacing of the lines is dependent upon the number of serrations or teeth and is not variable enough. Hatching rulers have also become known to the art in which a stepwise feed takes place by means of tiltable ledges. With such devices the maximum stepwise feed is dependent upon the height of the tiltable ledge and, therefore, is so small that they can only be used to advantage for cross-hatching, but not as a universal drafting device or apparatus possessing automatic measurement of the spacing between the parallel lines.

Summary of the invention

Accordingly, it is a primary objective of the present invention to provide through the employment of simple means a small or compact, handy and economical precision drafting apparatus which is especially suitable for the quick and accurate hatching and drawing of lines as well as also being able to be used for the quick and exact drawing of squares, rectangles and the like in one stroke, that is to say without having to put down the drawing instrument or pencil, and wherein the drafting device itself, by carrying out a preadjustment measures the exact desired size of the square, rectangle and lines and limits such during displacement and drawing of the lines.

A further noteworthy object of the present invention relates to an improved precision drafting apparatus which is relatively simple in construction, economical to manufacture, quite easy to use, possesses extreme versatility, and is not readily subject to breakdown or malfunction.

Another objective of the present invention is to provide an improved drafting device or apparatus of the mentioned type where adjustment or the adjustability of the device is designed such, that for the purpose of achieving the utmost accuracy, the adjustment scale is enlarged a number of times and wherein the adjustment can be carried out at impact or stop catches without having to displace the device or to lift same, and wherein such adjustment can be obtained both infinitely as well as for predetermined steps or increments, for instance, for all whole millimeters. These impact catches have been found to be very advantageous, because by virtue thereof it is possible to undertake the adjustment of the spacing for all complete or whole millimeters and each locked adjustment will always again provide the same degree or measurement, even if other different adjustments are used in between.

Generally speaking, the aforementioned objectives of the present invention are achieved as follows: a shaft member provided with good gripping rubber rollers at both ends is not, as was previously usual, freely rotatably mounted in fixed bearings provided at the housing or body of the device, rather such is held beneath the housing or body of the device by spring force against a stop means. The housing or body of the device bears by means of roughened roll-off surfaces from above upon the good gripping roller members. This causes the roller members to be advanced with respect to the device when the latter is displaced back or retracted. This action is utilized in order to limit the displacement path by means of an adjustable stop or impact member provided at the center of the shaft member. When the shaft member, during its advancing movement, strikes against the adjustable impact or stop member, then there has been completed a displacement path. By carrying out a small or slight tilting movement upon rubber legs or supports which are provided at the rear portion of the drafting device the roller members are now relieved of force, so that the shaft member thereof can spring back into its starting position against fixed stops provided at both sides of the device, and owing to the force of its spring suspension system. When the drafting device is again rested upon the rollers it is possible to roll off a further displacement path which is then exactly of the same size or magnitude as the previous displacement path, and this operation can be repeated, as desired. Since the displacement paths are limited between two stop or impact members, they are so exact that the momentary number of displacement paths which have been undertaken multiplied by the value of the pre-adjustment results in providing exactly the measurement for the total path which has been undertaken.

As will be explained more fully herein, the body or housing of the drafting device can possess the configuration of a more or less wide drafting ruler or the form of a geometric drafting plate having ruler edges. The length of the roll-off surfaces are determined by the path of the adjustable impact or stop member and, therefore, there is also determined the magnitude of the maximum displacement path of the device. If the device, by way of example, is designed such that the path of the adjustable stop member amounts to 15 millimeters, then, the maximum displacement path is 30 millimeters. This doubling results from the fact that the device rolls upon the roller members relative to the latter exactly through the same path or distance as the roller members roll with respect to the support. In the foregoing example such amounts to 15 millimeters in each instance, in other words a total displacement path of the device of 30 millimeters. In drafting devices in ruler form the adjustable impact or stop member is adjusted by a slide. This slide can be displaced through a path which is a number of times larger than the maximum displacement path of the device, by means of a handle or grip which projects from the rear portion of the ruler. This is achieved by virtue of the fact that a ledge member is located upon the slide which extends diagonally at a pitch of approximately, for instance 1:10, in which a smaller slide together with the adjustable stop member rotates through 90° with respect to the adjustment slide by means of a groove. Thus, during displacement of the adjustment slide through 10 millimeters the adjustable impact member is displaced by one millimeter. This brings about the multiple enlargement of the adjustment scale.

The adjustment locking or catch mechanism comprises impact cam means or equivalent structure provided in stationary fashion at the device and an impact cam or equivalent structure provided at the adjustment slide which can be tilted or rocked out of the operating zone of the stationary cams.

Devices in the form of a geometric drafting or drawing plate permit displacement paths of more than 100 millimeters. In such instance, the adjustable impact or stop means can be adjusted by a spiral groove provided at a rotatable circular scale or by a gear rack which is driven by a pinion provided at a large rotatable scale.

Brief description of the drawings

The invention will be better understood, and objects other than those set forth above, will become apparent, when consideration is given to the following detailed description thereof which, in the FIGURES 1 to 16 shows an exemplary embodiment of inventive drafting apparatus in the form of a small drafting apparatus constructed as a ruler, in other words serving for shorter displacement paths which, in this instance, amount to a maximum of 15 millimeters. More precisely, the description makes reference to the annexed drawings wherein:

FIGURE 1 is a schematic bottom view of the basic unit of the inventive drafting apparatus or device;

FIGURE 2 is a rear view of the housing or body member of the drafting device of FIGURE 1;

FIGURE 3 depicts, in top plan view, details of the adjustment slide provided with the small impact slide member;

FIGURE 4 shows details of the shaft member used in the inventive drafting apparatus and equipped with the two rubber rollers and its blade or leaf spring suspension provided at a sheet steel or sheet iron central clamp unit;

FIGURE 5 shows details of the blade spring;

FIGURE 6 depicts a detail of one of both square suspension ring members;

FIGURE 7 illustrates the drafting apparatus as viewed from the side;

FIGURE 8 is a cross-sectional view taken through the central region of the body or housing of the drafting apparatus of the invention;

FIGURE 9 shows details of the adjustment slide member and the impact slide member as viewed from the slide;

FIGURE 10 shows in side view details of the sheet iron central clamp unit;

FIGURE 11 is a view of the inventive drafting apparatus, depicting the adjustment for the displacement paths which is undertaken at the rear portion of the apparatus;

FIGURES 12a to 12f show the manner of using the inventive drafting apparatus;

FIGURE 13 is a fragmentary view of a 30 centimeter attachable ruler as viewed from the bottom;

FIGURE 14 illustrates the 30 centimeter attachable ruler of FIGURE 13 as viewed from the front;

FIGURE 15 is a front view of the inventive drafting apparatus with the attachable ruler mounted thereon; and FIGURE 16 depicts the drafting apparatus of FIGURE 15, viewed from the side, and with the attachable ruler mounted thereon.

Description of the preferred embodiment

Describing now the drawings, the body or housing 1 of the exemplary illustrated basic drafting apparatus is divided into two longitudinal regions or zones by a central rib member 2 at each end of which there is located a fixed or stationary stop member 3. At the forward longitudinal region or zone there are located the roughened roll-off surfaces 4, the rubber roller members 5 which are mounted upon the shaft 6, its spring suspension unit, to be considered shortly, which includes the blade spring 7 and the square attachment or securing ring members 8. At the center of the drafting device, there is located in a guide groove 9 the impact slide member 10 equipped with the adjustable impact or stop member 11 against which impinges the shaft member 6 when moving forward. At the front region there is located the straight edge 12 provided with the outer line impact or stop members 13.

Now, as far as the rear zone or region of the housing of body 1 of the inventive drafting device or apparatus, it should be understood that such serves throughout its entire width as a slide track for an adjustment slide member or unit 14. This adjustment slide member 14, the impact slide member as well as the blade spring 7 which holds the shaft 6 for the roller members 5, are held or retained together by means of a steel spring-central clamp unit 15 which is placed over the central rib 2 and engages by means of both of its hook members 16 into two holes or apertures 17 provided at the body or housing 1 of the drafting device. When the central clamp member or unit 15 is disengaged or detached, which can take place quite easily by using the nail of a finger and pushing away the hook members 16 in front of the handle 18 of the device (FIGURE 7), all of the components of the device can be disassembled without the use of any tools. Continuing, it should be understood that the plate portion or member 19 of the steel spring central clamp 15 resiliently presses against the adjustment slide member 14. This slide member 14 can be tilted or rocked somewhat about its front edge at the corner of the central rib 2 in order to pivot such out of the operating region of the catch or engagement cams 20, the latter being clearly shown in FIGURES 1 and 2. However, the plate member 19 will always again press this adjustment slide member 14 back into the operating region of the catches 20. These catches or catch cams 20 are located at the cutaway or recessed portion of the rear wall of the inventive device and through which the handle or grip member 21 for the adjustment slide 14 piercingly extends and further in which this grip 21 can be displaced. The catch cam 22 at the adjustment slide grip 21 and which cooperates with the catch cams 20 is clearly shown in FIGURES 3 and 9.

With the five-fold enlarged adjustment scale of the embodiment shown in the drawings, the spacing from center to center of the catch or locking cams 20 amounts to exactly 10 millimeters. The locking or catch cams 22 with each respective catch or locking cam 20 collectively possess a thickness of 5 millimeters, so that during displacement of the adjustment slide member 14 between two locking or catch cams 20 the displacement path amounts to 5 millimeters which, in turn, corresponds to a change of the spacing of the lines through one millimeter. In so doing, the displacement path from one side towards the other side of a locking or catch cam 20 likewise amounts to 5 millimeters. A respective rectangular recess is provided externally at the left and at the right of the rear wall of the drafting device in order to be able to receive rubber supports, for instance, in the form of rubber legs or ledges 23 which can be pressed into these rectangular recesses.

In the exemplary illustrated embodiment, the body or housing 1 of the device and the adjustment slide member 14 are preferably formed of a crystal clear or transparent plastic material of suitable type. The constructive solution of the overall arrangement of all of the components and their novel simple form or configuration renders it possible to use very simple injection molds for their manufacture, which considerably lowers production costs.

In FIGURES 3 and 9 the adjustment slide member 14 with the impact or stop slide member 10 is shown as viewed from the top and in a position providing for the largest adjustable line spacing which, in this exemplary embodiment, amounts for instance to 15 millimeters. More precisely, the adjustment slide member 14 and the aforementioned impact slide member 10 is therefore shown in its left position which it would assume at the drafting device in order to obtain this maximum line spacing, and further depicts the diagonal ledge means or member 24, the tilting edge 25, the slide grip 21, the catch or locking cam 22, the adjustment marker 26 and the guide groove 27 provided at the impact slide member 10 as well as the adjustable impact or stop 11.

Furthermore, in FIGURE 3 there is shown in phantom lines the extreme right-hand position of the adjustment slide member 14, which corresponds to the zero setting or position, and further there is shown the associated or corresponding position of the impact slide member 10, likewise in phantom. By referring to FIGURE 9 there will be observed a projection 28 which is provided at the slide grip member 21. During pivoting or tilting and displacement of the adjustment slide member 14 this projection 28 slides upon an edge 29 (FIGURES 2 and 11), whereby the tilting movement of the adjustment slide member 14 is limited and thus any dropping out thereof is prevented.

In FIGURE 4 there is separately depicted the complete roller suspension with the steel spring central clamp 15 in a condition where it is disengaged from the device. In FIGURE 5 blade or leaf spring 7 is shown alone. It has a recess 30 which fits in the inwardly flexed or bent web or bracket 31 of the central clamp 15, so that the blade spring 7 and, therefore, the entire shaft suspension can be retained against lateral displacement. The web members 32 of the central clamp 15 press the stop slide member 10 into its guide groove 9.

The arrows in FIGURE 11 depict the manner in which the adjustment slide can be adjusted. The small vertically extending arrow indicates the pivotal or tilting motion and thus the release of the adjustment grip from the region of the catches or locks, and the horizontal arrows designate the displacement towards the left for larger spacing of the lines and towards the right for smaller line spacing. A steel wire stirrup or bracket 33, which is mounted to be pivotal at the left and at the right in the rear wall of the drafting device, serves at its forward region, above the ruler edge, (FIGURE 15) as a holding rod means for the displaceable and rearwardly pivotal line limiting members 34. The latter are pressed in clamplike fashion onto the aforementioned holding rod. These line limiting members 34 serve to limit the length of the lines and as support or bearing members for the drafting instrument or pencil during rearward and forward displacement of the device and simultaneous drawing of the vertical lines. The desired spacing of the individual line limiting members 34 from one another is adjusted at the linear scale. The holding rod 33 can be provided without any gaps with rearwardly displaceable or tiltable line limiting members 34 which at the region of their clamping portion are exactly 5 millimeters wide. For certain lengths of the lines, which then are all divisible by 5, it is only then necessary to flip down the appropriate line limiting members 34, which renders possible the very quick adjustment of a number of short equal length lines at a linear edge. For line lengths which do not fit into this 5 millimeter division, one of the line limiting members 34 is removed and then the neighboring line limiting member is displaced through the desired amount. If in between it is necessary to again use the entire linear edge and if it is desired to maintain the adjustment of the line limiting members 34 for a successive or subsequent use, then it is only necessary to simply rearwardly tilt the entire steel wire bracket or stirrup 33. Furthermore, the steel wire bracket 33 together with the line limiting members 34 can easily be detached from the inventive device and replaced by a different bracket or stirrup provided with a different adjustment of the line limiting members. Additionally, the line limiting members 34 can, for the purpose of being able to more readily distinguish different size spacings, be constructed in different colors. Moreover, it will be recognized that a rearwardly pivotal and exchangeable steel wire bracket or stirrup 33' provided with line limiting members 34 is arranged at the attachable ruler 35 shown in FIGURE 14.

In FIGURE 13 there is illustrated the central portion of the attachable ruler 35 with its engagement aperture or hole 36, its support or bearing cams 37 and its locking or catch aperture or hole 38, whereas FIGURE 16, illustrates in side view, the attachable ruler mounted at the basic drafting device of the invention and with both steel wire brackets 33.

The division of the inventive drafting apparatus into a small basic unit or device whose 16 centimeter ruler edge is quite sufficient for most hatching-, ruling- and drafting work and a 30 centimeter attachable ruler for larger drafting work, has the advantage that the basic device of FIGURES 1 and 15 is much more price worthy or economical and easier to use than a similarly constructed unit possessing a width of 30 centimeters. The attachable ruler 35 can be subsequently purchased. It is simply mounted at the basic unit or device and is fixedly locked by means of a non-illustrated clamp through the locking or catch hole 38 at the locking aperture 39 of the basic unit, as with a pushbutton. The exact seating of the attachable or mountable ruler is fixed by its engaging aperture or recess 36 and its support cams 37.

The mode of operation of the inventive device, which has been shown in FIGURES 12a to 12f during continuous drawing of parallel lines having exactly equal spacing from one another, is as follows: initially, as shown in FIGURE 11, the desired spacing of the lines is adjusted by means of the adjustment grip 21 at the five-fold enlarged adjustment scale 40. The drafting device is placed at the desired location upon the drawing paper or sheet. Now with the left-hand the device is grasped at its handle or grip 18, and this device as shown in FIGURE 12 bears or rests upon its rubber roller members 5 and the rubber supports 23, and thereafter the device is pressed onto the support and the first line is drawn, as such is shown at the top of the FIGURE 12. Now, as depicted in FIGURE 12a the device is tilted somewhat towards the front while applying pressure to its roller members 5, so that at the rear the rubber legs or supports are freed and the device then only presses with its rollers upon the supports. Then, as shown in FIGURE 12b, the device is rolled towards the rear so that the pressure on the roller members follows the latter and holds such in equilibrium, during which such roller members move away from their fixed stop 32 until impacting against the adjustable stop 11. Now, shown in FIGURE 12c, the device is again lowered at its rear portion, and the next line is drawn. Now, as shown in FIGURE 12d, a pressure is exerted at the rear end of the device upon its rubber legs or supports so that the device is raised somewhat at the front, whereby the roller members are unloaded and therefore spring back into their starting position against the fixed stop. The next operation is as shown in FIGURE 12e, where the device is again tilted towards the front so that the pressure is again exerted upon its roller members, while raising the rubber legs or supports and the device is then once again rolled until the roller members impact against the adjustable stop. Then, as shown in FIGURE 12f, the device is lowered at its rear and a further line is drawn. Then the roller members are again allowed to spring-back, as previously explained, and the aforedescribed operation can be repeated as many times as desired.

In FIGURE 12 the illustrated curved arrows represent the direction of tilting and the straight arrows the pressure- and pulling direction. The phantom arrows designate, in each instance, which movement should next take place.

When drawing rectangules or quadratic geometric figures with the new and improved percision drafting arrangement of the invention the desired width is adjusted by means of two line limiting members 34 at the linear or ruler scale and the desired height is adjusted at the adjustment grip. Then the drafting instrument or pencil or the like is placed against the first or both adjusted line limiting members and the first horizontal line is drawn until arriving at the second line limiting member. At this location the drawing instrument is held against the edge which is formed by the line limiting member with regard to the ruler or linear edge, and the device with its adjusted displacement path is rolled rearwardly and in so doing the drawing instrument is allowed to follow in the corner, whereby the first vertical line is drawn. At the end of the displacement path the second horizontal line is drawn back to the first line limiting member. Then the device is forwardly displaced until impacting the starting position, whereby the drawing implement or instrument is allowed to follow in this corner and the second vertical line can be drawn.

It is also possible to adjust at a ruler edge a number of paths for the horizontal lines of rectangles and to draw these lines in succession. The vertical lines are drawn by forwardly and rearwardly rolling a number of times through the displacement paths between both stop members, while applying the drawing instrument or pencil in the corner of the line limiting member, or if a number of rectangles are to be drawn next to and below one another, by applying the device at an angle of 90°. Thus, for instance, it is possible to draw very quickly and accurately the window divisions of the facade of a high rise building or other structural unit.

As should now be apparent, the objects initially set forth at the outset of this specification have now been successfully achieved.

What is claimed is:

1. A precision drafting apparatus comprising housing means, roughened roll-off surface means provided on the underside of said housing means, elastic support means provided at the underside of said housing means, a shaft member provided with roller means, spring suspension means for mounting said shaft member which said roller means at the underside of said housing means for displacement, fixed stop means and adjustable stop means for limiting the rolling movement of said roller means, adjustment slide means including an adjustment grip means for operating said adjustment slide means, said adjustment slide means cooperating with said adjustable stop means to adjust the position of said adjustable stop means, locking cam means for locking said adjustment stop means, an enlarged scale adjustment scale means provided for said adjustment slide means, a pair of fixed line stop members provided at said housing means, an exchangeable support bracket provided for said housing means, displaceable line limiting members carried by said support bracket, and attachable ruler means releasably mountable at said housing means.

2. A precision drafting apparatus as defined in claim 1, wherein said elastic support means for said housing means is defined by at least one pair of rubber leg members arranged in spaced relationship at one end of said housing means at the underside thereof.

3. A precision drafting apparatus as defined in claim 1, wherein said locking cam means cooperable with said adjustment grip means includes a plurality of spaced locking cam members provided at said housing means and at least one locking cam member provided at said adjustment grip means, said at least one locking cam member being selectively engageable with said plurality of locking cam members at said housing means.

4. A precision drafting apparatus as defined in claim 1, wherein said roller means are positioned to roll upon said roughened roll-off surface means.

5. A precision drafting apparatus as defined in claim 1, wherein said spring suspension means cooperates with said shaft member and said roller means in such a way that after said roller means together with said shaft member have been displaced through each rollable path, said spring suspension means serves to return said shaft member together with said roller means into its starting position by tilting the drafting apparatus.

6. A precision drafting apparatus as defined in claim 1, wherein said fixed stop means and adjustable stop means serve to limit the displacement of said shaft member with said roller means.

7. A precision drafting apparatus as defined in claim 1, wherein said locking cam means includes a plurality of fixed locking cam members provided at said housing means and at least one displaceable locking cam member provided at said adjustment grip means for said adjustment slide means, and wherein during the pre-adjustment of the displacement paths said fixed locking cam members can be contacted at both sides by said at least one displaceable locking cam member.

8. A precision drafting apparatus comprising housing means, roll-off surface means provided at the underside of said housing means, a shaft member provided with roller means located at the underside of said housing means, said roller means cooperate in rolling fashion with said roll-off surface means, suspension means for displaceably mounting said shaft member together with said roller means at the underside of said housing means, fixed stop means and adjustable stop means for limiting the displacement of said shaft member together with said roller means, adjustment slide means including an adjustment grip means for operating said adjustment slide means, said adjustment slide means serving to regulate the position of said adjustable stop means, means for selectively temporarily locking said adjustment grip means and thereby said adjustment slide means in a predetermined position corresponding to a desired degree of displacement of said adjustable stop means, and scale means cooperating with said adjustment grip means to allow setting of the position of said adjustable stop means through the agency of said adjustment slide means.

9. A precision drafting apparatus as defined in claim 8, further including a pair of fixed line stop members provided at said housing means, an exchangeable support bracket provided for said housing means, displaceable line limiting members carried by said support bracket, an attachable ruler means releasably mountable at said housing means.

References Cited

UNITED STATES PATENTS 1,600,246   9/1926   Rehnquist _____ 33—110

FOREIGN PATENTS 159,085   3/1905   Germany.
613,398   11/1948   Great Britain.

HARRY N. HARDIAN, Primary Examiner